United States Patent
Somanath et al.

(10) Patent No.: US 8,113,768 B2
(45) Date of Patent: Feb. 14, 2012

(54) ACTUATED VARIABLE GEOMETRY MID-TURBINE FRAME DESIGN

(75) Inventors: Nagendra Somanath, Manchester, CT (US); Keshava B. Kumar, South Windsor, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 874 days.

(21) Appl. No.: 12/178,352

(22) Filed: Jul. 23, 2008

(65) Prior Publication Data
US 2010/0021286 A1 Jan. 28, 2010

(51) Int. Cl.
*F01D 25/24* (2006.01)
*F04D 29/40* (2006.01)

(52) U.S. Cl. ......... 415/126; 415/1; 415/127; 415/171.1; 415/173.2

(58) Field of Classification Search .............. 415/1, 126, 415/127, 171.1, 173.2
See application file for complete search history.

(56) References Cited

U.S. PATENT DOCUMENTS

| | | | |
|---|---|---|---|
| 4,492,078 A | 1/1985 | Williamson |
| 4,626,730 A | 12/1986 | Hubbard, Jr. |
| 4,742,261 A | 5/1988 | Rich et al. |
| 4,958,100 A | 9/1990 | Crawley et al. |
| 4,983,051 A | 1/1991 | Hibner et al. |
| 5,076,049 A | 12/1991 | Von Benken et al. |
| 5,249,418 A | 10/1993 | Finn |
| 5,483,792 A | 1/1996 | Czachor et al. |
| 6,082,959 A | 7/2000 | Van Duyn |
| 6,299,410 B1 | 10/2001 | Hilbert et al. |
| 6,428,269 B1 | 8/2002 | Boratgis et al. |
| 6,619,030 B1 | 9/2003 | Seda et al. |
| 6,708,482 B2 | 3/2004 | Seda |
| 6,883,303 B1 | 4/2005 | Seda |
| 7,097,412 B2 | 8/2006 | DiTomasso |
| 7,144,049 B2 | 12/2006 | Stangeland et al. |
| 2007/0231134 A1 | 10/2007 | Kumar et al. |
| 2007/0237635 A1 | 10/2007 | Nagendra et al. |

*Primary Examiner* — Jarrett Stark
*Assistant Examiner* — Nicholas Tobergte
(74) *Attorney, Agent, or Firm* — Kinney & Lange, P.A.

(57) ABSTRACT

A mid-turbine frame assembly includes a mid-turbine frame, a ring structure and a plurality of actuated struts. The ring structure surrounds the mid-turbine frame, and has an interior surface and an exterior surface. The actuated struts connect the ring structure to the mid-turbine frame. The actuated struts are strain actuated so that the actuated struts reposition the ring structure in response to a strain.

16 Claims, 6 Drawing Sheets

ACTUATED VARIABLE GEOMETRY MID-TURBINE FRAME DESIGN

BACKGROUND

Turbofans are a type of gas turbine engine commonly used in aircraft, such as jets. The turbofan generally includes high and low pressure compressors, high and low pressure turbines, high and low spool shafts, a fan, and a combustor. The high-pressure compressor (HPC) is connected to the high-pressure turbine (HPT) by the high spool rotatable shaft, and together act as a high-pressure system. Likewise, the low-pressure compressor (LPC) is connected to the low-pressure turbine (LPT) by the low spool rotatable shaft, and together act as a low-pressure system. The low spool shaft is housed within the high spool shaft and is connected to the fan such that the HPC, HPT, LPC, LPT, and high and low spool shafts are coaxially aligned.

Air is drawn into the jet turbine engine by the fan and the HPC. The HPC increases the pressure of the air drawn into the system. The high-pressure air then enters the combustor, which burns fuel and emits exhaust gas. The exhaust gas flows from the combustor into the HPT where it rotates the high spool shaft to drive the HPC. After the HPT, the exhaust gas is exhausted to the LPT. The LPT uses the exhaust gas to turn the low spool shaft, which powers the LPC and the fan to continually bring air into the system. Air brought in by the fan bypasses the HPT and LPT and acts to increase the engine's thrust, driving the jet forward.

In order to support the high and low pressure systems, bearings are located within the jet turbine engine to help distribute the load created by the high and low pressure systems. The bearings are connected to an engine casing that houses a mid-turbine frame located between the HPT and the LPT by bearing support structures. The bearing support structures can be, for example, bearing cones. The load from the bearing support structures are transferred to the engine casing through the mid-turbine frame. Decreasing the weight of the engine casing can significantly increase the efficiency of the jet turbine engine and the jet itself. Additionally, maintaining the sealing continuality between the HPT and the mid-turbine frame, and between the LPT and the mid-turbine frame, reduces leakage and also improves the efficiency of the jet turbine engine.

SUMMARY

A mid-turbine frame assembly includes a mid-turbine frame, a ring structure and a plurality of actuated struts. The ring structure surrounds the mid-turbine frame and has an interior and an exterior surface. The actuated struts connect the ring structure to the mid-turbine frame. The actuated struts are strain actuated so that the actuated struts reposition the ring structure in response to a strain.

DETAILED DESCRIPTION

Figure 1:
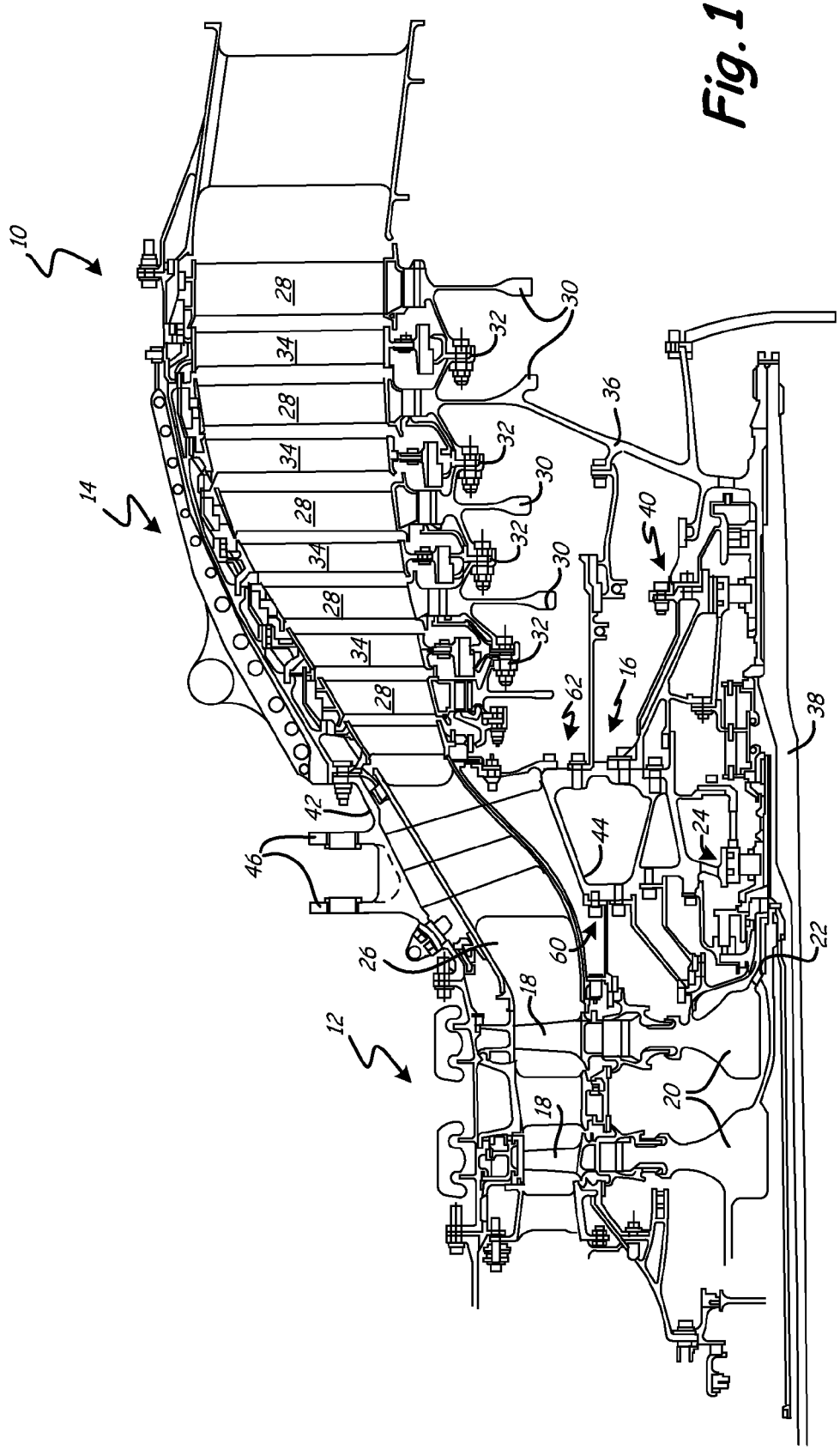
FIG. 1 is a partial sectional view of an intermediate portion of a gas turbine engine.

FIG. 1 shows the turbine section of a gas turbine aircraft engine 10 about a gas turbine engine axis centerline. Gas turbine engine 10 generally includes high-pressure turbine 12, low-pressure turbine 14 and mid-turbine frame 16.

High-pressure turbine 12 includes one or more rows of blades 18 mounted on the rim of a disk 20. Disk 20 attaches to high spool (or high-pressure) shaft 22, which first (or forward) bearing 24 supports. High-pressure turbine 12 exhausts hot gases into annular flow chamber 26.

Exhaust gas from high-pressure turbine 12 flows through annular flow chamber 26 and into low-pressure turbine 14. Low-pressure turbine 14 includes a number of rows of blades 28 mounted onto disks 30. Bolts 32 bolt disks 30 together. Blades 28 are alternated with stationary vanes 34. One or more blades 28 may have an extension 36 of low spool (or low-pressure) shaft 38. Second (or aft) bearing 40 supports low spool shaft 38.

Mid-turbine frame assembly 16 is located in annular flow chamber 26, between high-pressure turbine 12 and low-pressure turbine 14. Mid-turbine frame assembly 16 includes engine casing 42, mid-turbine frame 44, mounts 46, first bearing 24 and second bearing 40. For convenience, mid-turbine frame assembly 16 will be referred to as having a forward side 60 adjacent to high-pressure turbine 12 in engine 10 and aft side 62 adjacent to low-pressure turbine 14 in engine 10. Mid-turbine frame assembly 16 has an actuated variable geometry that increases the efficiency of engine 10 by maintaining continuity between high pressure turbine 12 and low pressure turbine 14, thus minimizing thermodynamic losses. Mid-turbine frame assembly 16 also has a lightweight design that transfers a minimum amount of unbalanced loads from first bearing 24 and second bearing 40 through mid-turbine frame 44 to casing 42 and mounts 46.

Engine casing 42 surrounds mid-turbine frame 44, and protects mid-turbine frame 44 from the surroundings. Engine casing 42 functions to transfer loads from mid-turbine frame 44 to mounts 46.

Mid-turbine frame 44 is housed within engine casing 42, and connects to engine casing 42 and first and second bearings 24 and 40. Mid-turbine frame 44 transfers the loads from the first and second bearings 24 and 40 to engine casing 42 and mounts 46. Mid-turbine frame 44 normalizes and equilibrates the loads from first and second bearings 24 and 40 so that a minimum amount of unbalanced load is transferred to mounts 46.

First and second bearings 24 and 40 are located at forward end 60 and aft end 62 of mid-turbine frame assembly 16, respectively, below engine casing 42. First and second bearings 24 and 40 support thrust loads, vertical tension, side gyroscopic loads, as well as vibratory loads from high and low spool shafts 22 and 38 located in gas turbine engine 10. The loads supported by first bearing 24 and second bearings 40 transfer to engine casing 42 and mounts 46 through mid-turbine frame 44.

Figure 2:
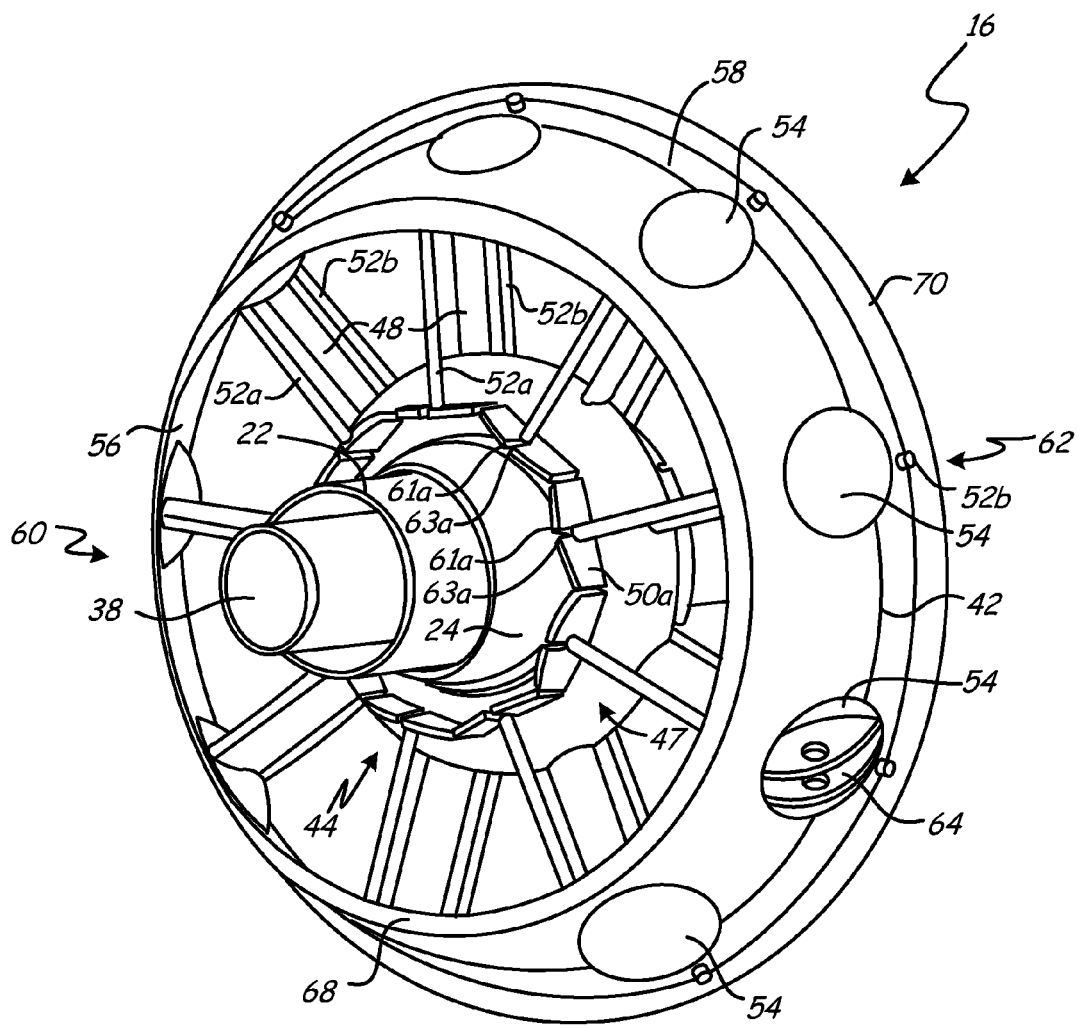
FIG. 2 is an enlarged perspective view of a mid-turbine frame assembly having an actuated variable geometry.
Figure 3:
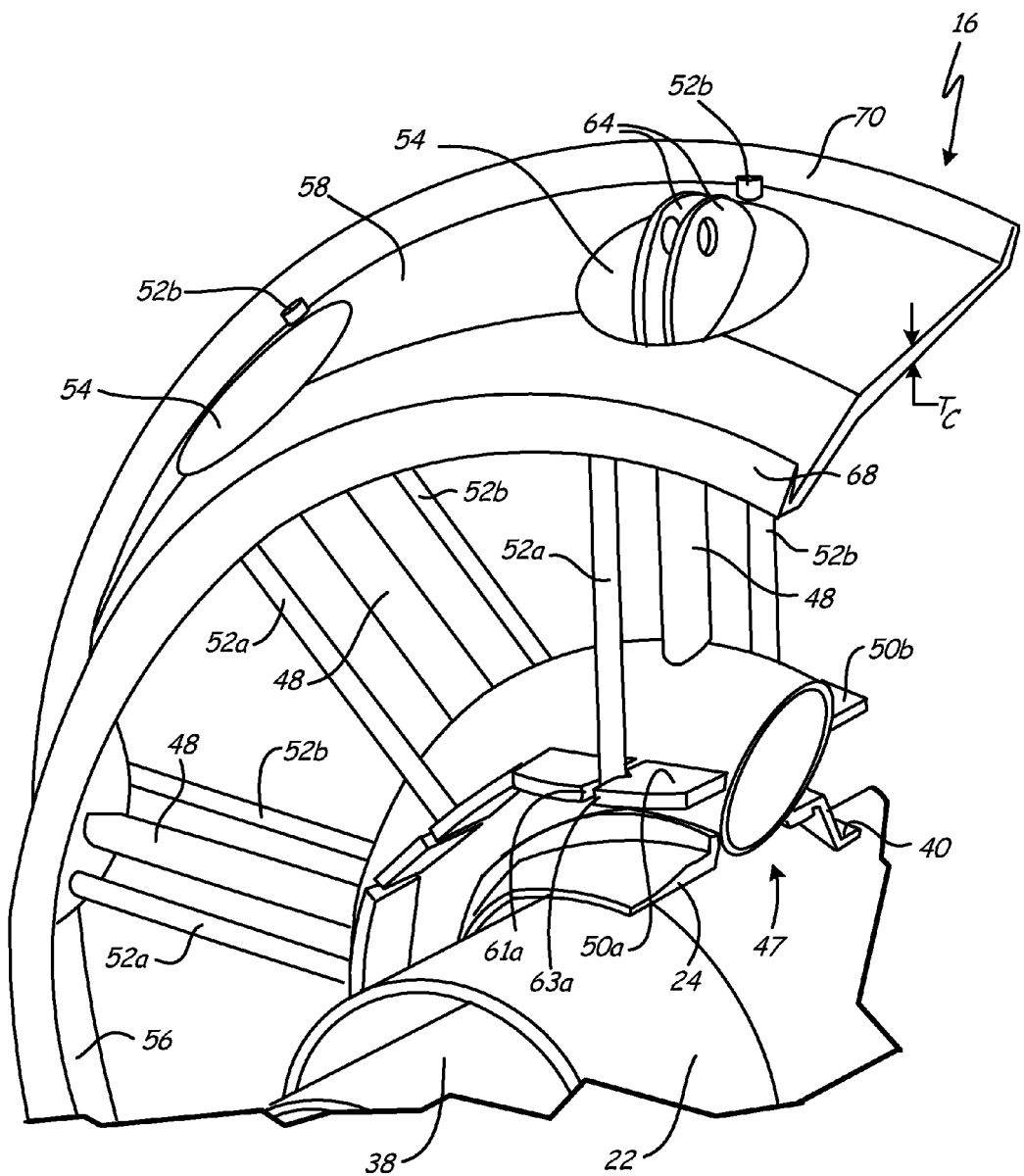
FIG. 3 is a cross-sectional perspective view of the mid-turbine frame assembly.

FIGS. 2 and 3 are an enlarged perspective view of mid-turbine frame assembly 16 and a cross-sectional perspective view mid-turbine frame assembly 16 respectively, and will be discussed together. Mid-turbine frame assembly 16 includes engine casing 42 and mid-turbine frame 44. Engine casing 42 surrounds mid-turbine frame 44 as previously described. Engine casing 42 has interior surface 56 and exterior surface 58. Dimples 54 are formed in engine casing 42 so that protrusions extend from interior surface 56 and indentions are formed in exterior surface 58. Dimples 54 project towards but do not engage mid-turbine frame 44. Dimples 54 stiffen engine casing 42, eliminating the need for rails along exterior surface 58 of engine casing 42. The elimination of rails gives engine casing 42 a lightweight and cost-effective structure. Additionally, the elimination of rails reduces the drag on engine casing 42.

Mid-turbine frame 44 generally includes torque box 47, structural struts 48, actuation plates 50a, 50b and actuation (or oleo) struts 52a, 52b. Torque box 47 has a ring structure and is positioned between first bearing 24 and second bearing 40 and structural struts 48. Torque box 47 takes the loads, or torque, from first and second bearing 24 and 40 and combines them prior to transferring the loads to structural struts 48 and oleo struts 52a and 52b.

Structural struts 48 extend between interior surface 56 of engine casing 42 and torque box 47. First end 55 of structural strut 48 connects to torque box 47. Second end 57 of structural strut 48 connects to interior surface 56 of engine casing 42 at the center of dimples 54. Structural struts 48 transfer a portion of the loads from first and second bearings 24 and 40 to mounts 46.

Dimples 54 shorten the length of structural struts 48. The length of structural struts 48 determines the critical buckling load of the struts; the critical buckling load varies inversely as a square of the length of the strut (i.e. a shorter strut increases the critical buckling load of the strut). The shortened length of structural struts 48 between dimple 54 and torque box 47 increases the critical buckling load and the load carrying capacity of structural struts 48. The shortened structural struts 48 also reduce the weight of mid-turbine engine assembly 16, thus increasing the specific fuel consumption (SFC) of engine 10. Additionally, structural struts 48 may be hollow to further reduce the weight of engine 10.

When coupled with structural struts 48, dimples 54 act as local stiffeners and increase the critical buckling load of engine casing 42. The increased critical buckling load of engine casing 42 allows wall thickness $T_c$ of engine casing 42 to be thinner while still providing the same load capacity. Thus, the weight of engine casing 42 is reduced and the SFC of engine 10 is increased.

Actuation plates 50a, 50b attach around the circumference of and axially extend from torque box 47. Forward actuation plates 50a attach to forward side 60 of torque box 47, and aft actuation plates 50b attach to aft side 62 of torque box 47. One forward actuation slot 61a is formed in each forward actuation plate 50a, and one aft actuation slot 61b is formed in each aft actuation plate 50b. In one example, actuation slots 61a, 61b are formed in the center of actuation plates 50a, 50b and extend away from torque box 47. In another example, actuation slots 61a, 61b extend along an axis parallel to the axis of high spool shaft 22.

Oleo struts 52a, 52b extend between actuation plates 50a, 50b and engine casing 42. Oleo struts 52a, 52b are located on opposite sides of structural strut 48. Forward oleo strut 52a connects to forward side 60 of engine casing 42 and to forward actuation plate 50a. Aft oleo strut 52b connects to aft side 62 of engine casing 42 and aft actuation plate 50b. One forward oleo strut 52a fits within each forward actuation slot 61a in forward actuation plates 50a. Similarly, one aft oleo strut 52b fits within each aft actuation slot 61b in aft actuation plates 50b.

Oleo struts 52a, 52b are active actuator struts that transfer amplified displacements caused by actuation plates 50a, 50b as local vertical forces. Movement of oleo struts 52a, 52b reposition forward side 60 of engine casing 42 and aft side 62 of engine casing 42 respectively. Because each oleo strut 52a, 52b is attached to an individually actuated actuation plate 50a, 50b, each oleo strut is individually actuated.

Forward and aft actuation plates 50a and 50b contain piezoelectric actuators 63a, 63b having piezoelectric material in actuation slots 61a, 61b. Piezoelectric materials produce an electric energy when deformed or strained, and conversely transform electrical energy fields into mechanical deformation or strain actuation. In one example, the piezoelectric material is a naturally occurring material such as quartz, Rochelle salt or tourmaline. In another example, the piezoelectric material is a manufactured piezoelectric ceramic having enhanced piezoelectric properties, such as polycrystalline ferroelectric materials (i.e. barium titanate ($BaTiO_s$)) and lead zirconate titanate (PZT).

In response to a sensed strain, piezoelectric actuator 63a in actuation slot 61a produces voltage. This voltage is sensed and an amplified voltage is applied to piezoelectric actuator 63a. In response to the amplified voltage, piezoelectric actuator 63a deforms causing actuation plate 50a to actuate or move. The movement of actuation plate 50a vertically actuates oleo strut 52a, and repositions engine casing 42. Piezoelectric actuator 63b, actuation plate 50b, and oleo strut 52b function in a similar manner. Thus, piezoelectric actuators 63a, 63b convert a strain in the torque box into an amplified force that repositions engine casing 42. The strain sensed may be due to interference pressure of adjacent components, thermal growth, mechanical growth or temperature differences.

Piezoelectric actuators 63a, 63b may be configured as, for example, a unimorph piezoelectric actuator, a multilayer piezo bender or a multilayer piezoelectric actuator. Piezoelectric actuators 63a, 63b may contain a steel layer and/or a ceramic layer. The steel layer senses mechanical loads or strains, and the ceramic layer senses thermal loads. Thus, in one example where piezoelectric actuators 63a, 63b have a steel layer and a ceramic layer, oleo struts 52a, 52b are actuated based upon sensed mechanical strains and sensed thermal strains.

Figure 4:
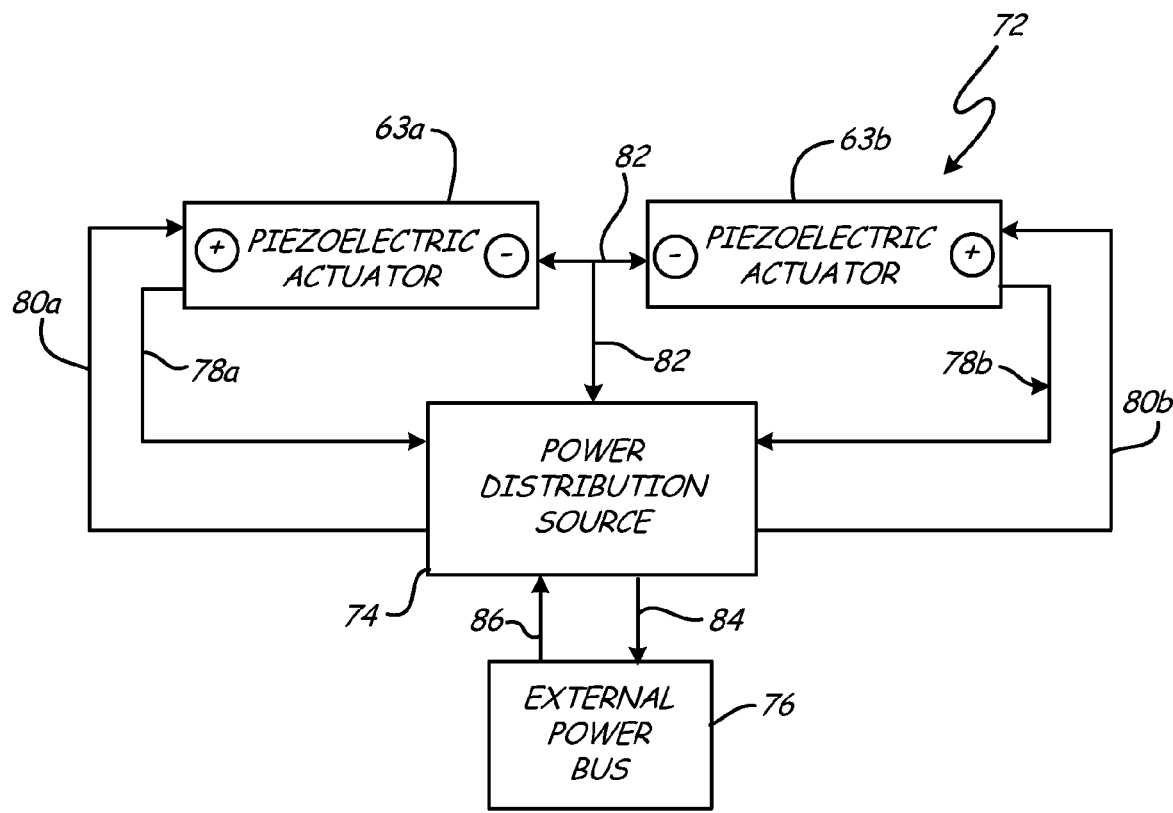
FIG. 4 is a block diagram of the circuitry for the mid-turbine frame assembly.

FIG. 4 illustrates circuitry 72 used to actuate piezoelectric actuators 63a, 63b. Circuit 72 includes piezoelectric actuators 63a, 63b, power distribution source 74 and external power bus 76. Piezoelectric actuators 63a, 63b are connected to power distribution source 74 by transmission lines 78a, 78b and reception lines 80a, 80b. Transmission lines 78a, 78b transmit a voltage from piezoelectric actuators 63a, 63b to power distribution source 74. Reception lines 80a, 80b transmit an amplified voltage from power distribution source 74 to piezoelectric actuators 63a, 63b. Piezoelectric actuators 63a, 63b are also connected to each other and to power distribution source 74 by grounding lines 82.

Power distribution source 74 is connected to external power bus 76 by transmission line 84 and reception line 86. External power bus 76 transfers a specified voltage to power distribution source 74 through reception line 84 based upon a signal sent by power distribution source 74 through transmission line 84.

When piezoelectric actuator 63a senses a strain, it produces a voltage. This voltage is transferred to power distribution source 74 through transmission line 78a. If the voltage is above a predetermined threshold, power distribution source 74 calls on external power bus 76 to generate an amplified voltage by sending a signal through transmission line 84. The amplified voltage is transferred through reception lines 86 and 80a to piezoelectric actuator 63a in order to actuate piezoelectric actuator 63a. Piezoelectric actuator 63b functions in a similar manner.

Power distribution source 74 will only distribute a voltage to piezoelectric actuators 63a, 63b if the sensed strain or produced voltage is above a predetermined threshold. For example, if the sensed strain is mechanical growth, a voltage is only applied to piezoelectric actuators 63a, 63b when a movement at least about equal to the movement expected at the redline speed (or maximum speed of high spool shaft 22) plus about 1% to about 5% is sensed. In this example, a voltage is not applied to piezoelectric actuators 63a, 63b when the sensed movements are less than the movement expected at the redline speed plus about 1% to about 5%.

Power distribution source 74 determines by how much the voltage from piezoelectric actuators 63a, 63b should be amplified. Power distribution source 74 determines the voltage applied to piezoelectric actuators 63a, 63b through lines 80a, 80b based upon the magnitude of the voltage through lines 78a, 78b from piezoelectric actuators 63a, 63b. Additionally or alternatively, power distribution source 74 may determine the voltage applied to piezoelectric actuators 63a, 63b based upon the magnitude of the voltage change from piezoelectric actuators 63a, 63b (i.e. how quickly the strain grows or changes).

As described above, actuation plates 50a, 50b extend around the circumference of torque box 47. Each actuation plate 50a, 50b contains a piezoelectric actuator 63a, 63b. Each piezoelectric actuator 63a, 63b is connected to power distribution source 74. Therefore, each piezoelectric actuator 63a, 63b may be individually actuated based on the loads or strains sensed by that particular actuator 63a, 63b.

Circuit 72 may be designed with redundancies in case of a failure of one of the elements. For example, circuit 72 may contain two power distribution sources 74 in the event that the primary power distribution source 74 fails. Each power distribution source 74 would be connected to each piezoelectric actuator 63a, 63b in mid-turbine frame assembly 16. Similarly, circuit 72 may be designed with two external power buses 76, wherein each external power bus 76 is connected to each power distribution source 74.

Figure 5:
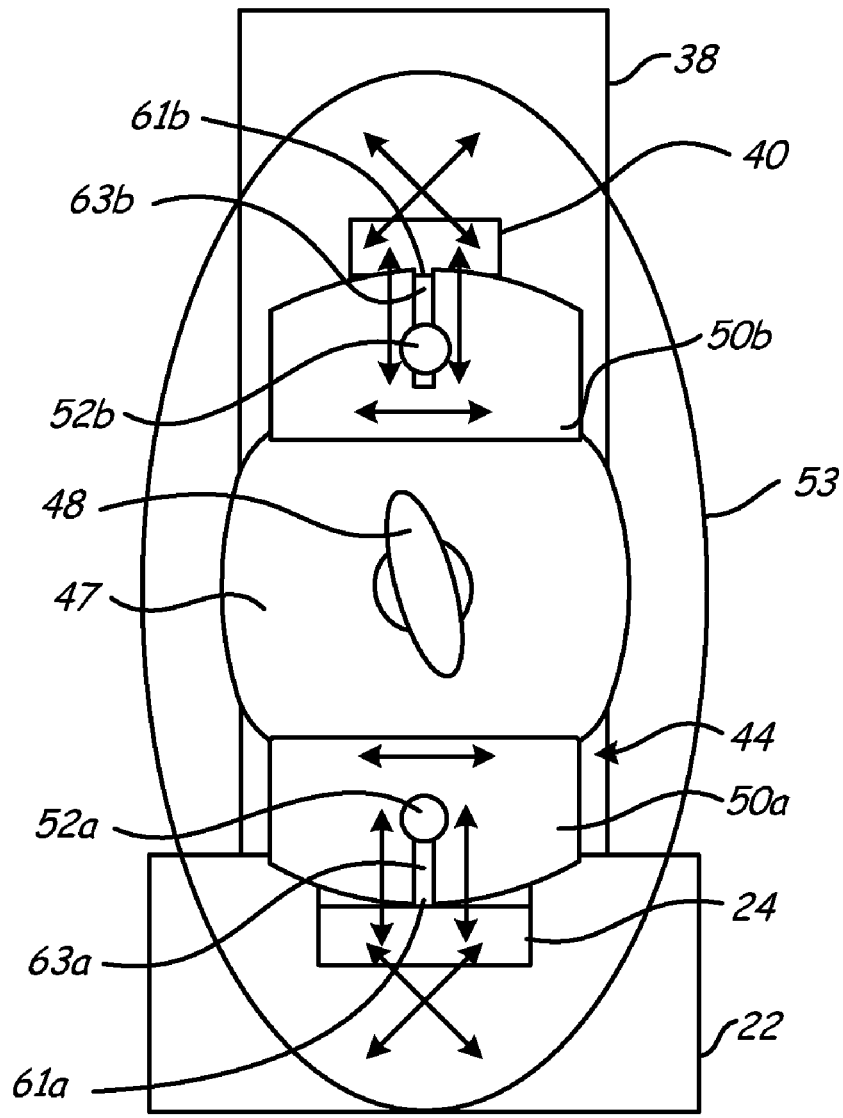
FIG. 5 is a top view of a segment of the mid-turbine frame assembly.

FIG. 5 is a top view of a segment of mid-turbine frame assembly 16 wherein engine casing 42 has been removed for clarity. Oleo struts 52a, 52b are located in actuation slots 61a, 61b, which contain piezoelectric actuators 63a, 63b. Oleo struts 52a, 52b are located on opposite sides of structural struts 48. As shown, oleo struts 52a, 52b and structural strut 48 are located within vane envelope 53. Oleo struts 52a, 52b are maintained about parallel to each other. In another example, forward strut 52a is maintained within about 2 degrees of being parallel with aft oleo strut 52b.

As shown in FIG. 5, piezoelectric actuators 63a, 63b in actuation slots 61a, 61b develop axial, transverse and shear strain actuation in mid-turbine frame 44 in response to a sensed strain. As discussed above, bearings 24, 40 introduce horizontal, vertical and off-axis loads into torque box 42. For example, horizontal or off-axis loads may be introduced by bearings 24, 40 due to the dynamics of shafts 22 and 38 or thermal differences. The strain actuation of piezoelectric actuators 63a, 63b in actuation slots 61a, 61b causes self-equilibration of engine casing 42, and results in a minimum amount of unbalanced loads being transferred to mounts 46.

When piezoelectric actuator 63a in actuation slots 61a senses a strain in torque box 47, an amplified voltage is applied to piezoelectric actuator 63a. The applied voltage causes piezoelectric actuator 63a to deform and vibrate. The vibrations from piezoelectric actuator 63a create axial, transverse and shear strain actuations that equilibrate the in-plane loads locally around oleo strut 52a. Additionally, piezoelectric actuator 63a deforms and causes vertical motion of oleo strut 52a to equalize the vertical loads. Piezoelectric actuator 63b function in a similar manner. Piezoelectric actuators 63a, 63b may cause strain actuation because of a sensed thermal growth, mechanical vibration, such as a vibration due to sharp rotation, or interference growth.

Figure 6:
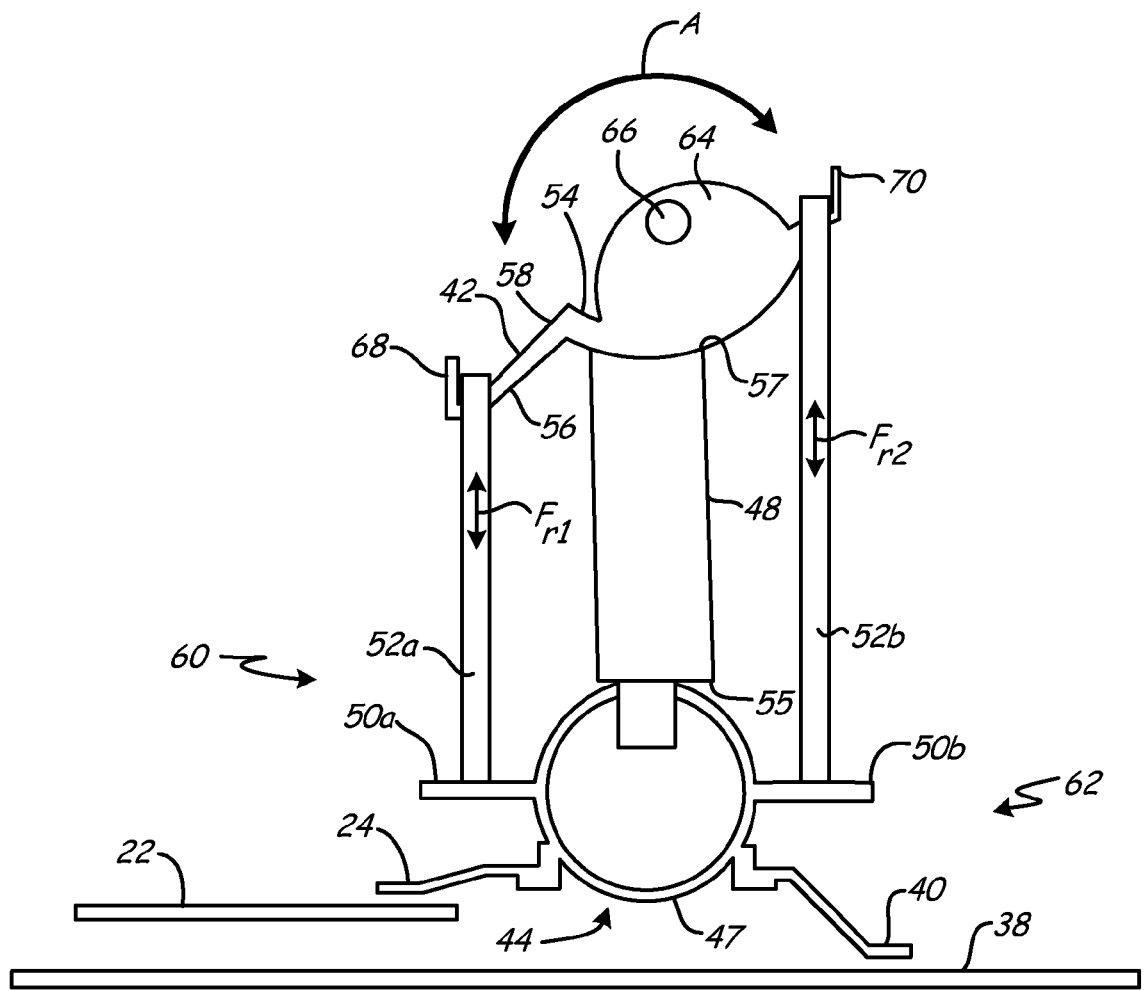
FIG. 6 is a cross-sectional perspective view of a segment of the mid-turbine frame assembly.

FIG. 6 is cross-sectional perspective view of a segment of mid-turbine frame assembly 16 having mid-turbine frame 44 and engine casing 42. Engine casing 42 surrounds mid-turbine frame 44. Dimple 54 formed in engine casing 42 creates a protrusion extending from internal surface 56 of engine casing 42 and an intention in exterior surface 58 of engine casing 42.

High spool shaft 22 transfers loads to first bearing 24, and low spool shaft 38 transfers loads to second bearing 40. First and second bearings 24 and 40 introduce the loads into torque box 47 of mid-turbine frame 44, where the loads are combined and equilibrated.

Structural strut 48 transfers loads from torque box 47 to engine casing 42. First end 55 of structural strut 48 attaches to torque box 47 and second end 57 of structural strut 48 attaches to engine casing 42 at dimple 54. In one embodiment, dimples 54 and structural struts 48 are equal in number such that each structural strut 48 connects to engine casing 42 at a different dimple 54. In another embodiment, structural struts 48 are elliptical in shape and are sized to take a load and transfer it in a vertical direction toward engine casing 42. In another embodiment, nine structural struts are positioned approximately forty degrees apart from one another along the circumference of torque box 47. In another embodiment, twelve total structural struts are positioned approximately thirty degrees apart from one another along the circumference of torque box 47.

Actuation plates 50a and 50b attach to torque box 47. Forward actuation plate 50a attaches on forward side 60 of torque box 47, and aft actuation plate 50b attaches on aft side 62 of torque box 47.

Oleo struts 52a, 52b extend between engine casing 42 and actuation plates 50a, 50b, respectively. Forward oleo struts 52a and aft oleo struts 52b are located on opposite sides of structural strut 48. Oleo struts 52a, 52b extend through engine casing 42 so that when oleo struts 52a, 52b are actuated by actuation plates 50a, 50b, engine casing 42 is repositioned. One forward oleo strut 52a is placed on the forward side of each structural strut 48 and one aft oleo strut 52b is placed on the aft side of each structural strut 48 so that oleo struts 52a, 52b are on opposite sides of structural struts 48.

In use, in order to reposition oleo struts 52a, 52b, piezoelectric actuators 63a, 63b in actuation plates 50a, 50b measure or detect strains due to thermal strain growth, interference pressure, or mechanical strain. Actuation plates 50a, 50b reflect the detected strain actuation as an amplified vertical force supplied to oleo struts 52a, 52b. Oleo struts 52a, 52b transmit the amplified force to engine casing 42, which is repositioned.

Forward flange 68 extends from engine casing 42 on forward side 60 of engine casing 42, and aft flange 70 extends from engine casing 42 on aft side 62 of engine casing 42. Forward and aft flanges 68 and 70 connect mid-turbine frame assembly 16 to high-pressure turbine 12 and low-pressure turbine 14 respectively.

FIG. 6 illustrates how the actuation of oleo struts 52a, 52b balances and equalizes the vertical loads from bearings 24, 40 prior to transferring them to mounts 46. In response to a sensed force, piezoelectric actuators 63a, 63b in actuation slot 61a deform to amplify the force in the vertical direction. The deformation moves forward oleo strut 52a illustrated by force $F_{r1}$, causing small motions in engine casing 42. Engine casing 42 transfers the motions to aft oleo strut 52b illustrated by force $F_{r2}$ so that engine casing 42 follows an arching pattern as illustrated by arrow A and the vertical forces are balanced.

The self-equilibrating case motion caused by the actuation of oleo struts 52a, 52b is small to ensure structural stability, and adjusts engine casing 42 to maintain compatibility with high-pressure turbine 12 and low-pressure turbine 14. Oleo struts 52a, 52b ensure that the case distortions induced by high-pressure turbine 12 and low pressure-turbine 14 are small.

As a whole, mid-turbine frame assembly 16 brings all loads introduced into the torque box 47 by first bearing 24 and second bearing 40 in all coordinate directions into equilibrium. Actuation plates 50a, 50b equilibrate the horizontal and off-axis loads while oleo struts 52a, 52b equilibrate the vertical loads. For example, piezoelectric actuators 63a, 63b in forward actuation plate 50a create strain actuation equal and opposite in direction to the horizontal and off-axis loads introduced by high spool shaft 22. In this way, forward actuation plate 50a equilibrates the horizontal and off-axis loads. Aft actuation plate 50b works in a similar manner.

Additionally, the actuation of forward oleo strut 52a equilibrates the vertical load introduced into the torque box 47 using engine casing 42 and aft oleo strut 52b. Piezoelectric actuators 63a, 63b in forward actuation plate 50a amplify the vertical loads and create actuation force $F_{r1}$ which actuates forward oleo strut 52a. The actuation of forward oleo strut 52a transfers the vertical load through engine casing 42 to aft oleo strut 52b. Forward oleo strut 52a reacts to vertical loads only. Aft oleo strut 52b works in a similar manner, transferring loads to forward oleo strut 52a through engine casing 42.

High spool shaft 22 and low spool shaft 38 rotate at different angular speeds, and introduce different loads into mid-turbine frame 44 and torque box 47. The load difference between high and low spool shafts 22 and 38 may cause distortion of engine casing 42, such as ovalization. To prevent distortion of engine casing 42, mid-turbine frame 44 and oleo struts 52a, 52b equilibrate the loads before transferring them to engine casing 42. It is important to maintain the circular geometry of engine casing 42 to prevent rotating engine casing 42 from interfering with surrounding stationary structures.

The actuation of oleo struts 52a, 52b also maintains continuity between high pressure turbine 12 and low pressure turbine 14. Mid-turbine frame assembly 16 is located between high-pressure turbine 12 and low-pressure turbine 14. High-pressure turbine 12 operates at a higher temperature than low-pressure turbine 14. Therefore, high-pressure turbine 12 and low-pressure turbine 14 have different thermal growth rates.

To maintain conformity between forward side 60 of mid-turbine frame assembly 16 and high-pressure turbine 12, and between aft side 62 of mid-turbine frame assembly 16 and low-pressure turbine 14, forward and aft sides 60 and 62 of engine casing 42 must be able to be independently adjusted. Forward oleo struts 52a allow the diameter on forward side 60 of engine casing 42 to be adjusted independent of the diameter of aft side 62 of engine casing 43. Aft oleo struts 52b function in a similar way. Because forward side 60 of engine casing 42 is impacted by a uniform thermo-mechanical field, each forward oleo strut 52a is similarly actuated. Thus preventing ovalization of engine casing 42 on forward side 60. Similarly, aft side 62 of engine casing 42 is impacted by a uniform thermo-mechanical field so that each individual aft oleo strut 52b is similarly actuated to prevent ovalization of engine casing 42. Oleo struts 52a, 52b reposition engine casing 42 to minimize leaks, ensure sealing continuity between high and low pressure turbines 12 and 14, and ensure appropriate case conformity between structures, thus minimizing thermodynamic losses and improving the efficiency of engine 10.

Forward oleo strut 52a and aft oleo strut 52b should be about parallel. However, because of the load differential between high spool shaft 22 and low spool shaft 38, oleo struts 52a, 52b do not have the same deflection. Oleo struts 52a, 52b should be actuated so that they are maintained within about two degrees of parallel to each other.

Embedded mounts 64 are embedded within dimples 54 and eliminate the need for rails on exterior surface 58 of engine casing 42. Because embedded mounts 64 are embedded within dimples 54, embedded mounts 64 enable localized load paths directly to engine casing 42, and provide efficient load and stress distribution in combination with the stiffening effect of dimples 54 on engine casing 42. Embedded mounts 64 also serve to connect engine casing 42 to mounts 46 (shown in FIG. 1). Embedded mounts 64 have a height at least equal to the height of dimples 54 to ensure that embedded mounts 64 can adequately act as load transfer means to mounts 46. One embedded mount 64 is necessary at every location where mounts 46 come in contact with engine casing 42, which depends upon the external architecture of engine casing 42. In one example, engine casing 42 has at least three embedded mounts 64. In another example, every dimple 54 contains at least one embedded mount 64.

Rails are no longer necessary to ensure stiffness of engine casing 42 because engine casing 42 changes geometry based on strains developed due to thermo-mechanical effects. The actuated geometry of assembly 16 also postpones case ovalization and case buckling. The geometry changes occur uniformly along the circumference of forward side 60 and aft side 62 of engine casing 42, ensuring circular case geometry and maintaining continuity with the adjacent high pressure turbine 12 and low pressure turbine 14.

Mid-turbine frame assembly 16 has a lightweight and cost effective structure. As explained above, the structure of mid-turbine frame assembly 16 eliminates the need for rails. Additionally, dimples 54, together with structural struts 48 and oleo struts 52a, 52b increase the load carrying capacity of engine casing 42, allowing the thickness of engine casing 42 to be reduced. Further, the presence of oleo struts 52a and 52b allows thickness of structural struts 48 to be reduced while maintaining the same critical buckling loads for assembly 16 because oleo struts 52a and 52b transfer a portion of the load. In one example, mid-turbine frame assembly 16 has a weight reduction of about 10% to about 12%. In another example, mid-turbine frame assembly 16 weighs about 160 pounds. The weight reduction positively impacts weight related performance metrics such as specific fuel consumption (SFC).

Although the present invention has been described with reference to preferred embodiments, workers skilled in the art will recognize that changes may be made in form and detail without departing from the spirit and scope of the invention. For example, although the present invention has been described as having a dimpled engine casing, any engine casing design may be used in the mid-turbine frame assembly.

The invention claimed is:

1. A mid-turbine frame assembly comprising:
   a mid-turbine frame;
   a ring structure surrounding the mid-turbine frame, the ring structuring having an interior surface and an exterior surface; and
   a plurality of actuated struts connecting the ring structure to the mid-turbine frame, wherein the actuated struts are strain actuated so that the actuated struts reposition the ring structure in response to a strain.

2. The mid-turbine frame assembly of claim 1, wherein the actuated struts comprise:
   a plurality of first actuated struts; and
   a plurality of second actuated struts, wherein the first actuated struts and the second actuated struts are axially spaced apart.

3. The mid-turbine frame assembly of claim 2, wherein each first actuated strut is aligned with one second actuated strut.

4. The mid-turbine frame assembly of claim 3, wherein the first actuated strut is within about two degrees to parallel with the aligned second actuated strut.

5. The mid-turbine frame assembly of claim 2, wherein the first and second actuated struts apply a vertical force to the engine casing.

6. The mid-turbine frame assembly of claim 2, wherein the first actuated struts are individually actuated.

7. The mid-turbine frame assembly of claim 1, and further comprising:
   a plurality of actuation plates connected to the mid-turbine frame and the actuated struts for actuating the actuated struts.

8. The mid-turbine frame assembly of claim 7, wherein the actuation plates contain a piezoelectric material.

9. The mid-turbine frame assembly of claim 8, and further comprising:
   a power distribution source connected to the piezoelectric material for applying a voltage to the piezoelectric material.

10. The mid-turbine frame assembly of claim 8, wherein the piezoelectric material is configured as one of: a unimorph piezoelectric actuator, a multilayer piezo bender and a multilayer piezoelectric actuator.

11. The mid-turbine frame assembly of claim 8, wherein the piezoelectric material comprises:
    a metal layer for sensing mechanical strains; and
    a ceramic layer for sensing thermal strains.

12. The mid-turbine frame assembly of claim 1, wherein the actuated struts are actuated to normalize and equalize vertical loads.

13. An actuated variable geometry mid-turbine frame assembly comprising:
    a torque box;
    a circular engine casing surrounding the torque box;
    a plurality of structural struts connecting the torque box to the engine casing, each structural strut having a first side and a second side;
    a plurality of actuated first oleo struts on the first side of the structural struts, the first oleo struts extending from the torque box to the engine casing; and
    a plurality of actuated second oleo struts on the second side of the structural struts, the second oleo struts extending from the torque box to the engine casing and axially aligned with the first oleo struts, wherein the first oleo struts and the second oleo struts equilibrate and transfer loads to the engine casing.

14. The mid-turbine frame assembly of claim 13, wherein the first side of the structural struts is opposite the second side of the structural struts.

15. The mid-turbine frame assembly of claim 13, and further comprising a first actuation plate between the torque box and each first oleo strut.

16. The mid-turbine frame assembly of claim 15, and further comprising a piezoelectric material on each actuation plate to actuate the actuation plates.

* * * * *